United States Patent
Barat Quesada et al.

(10) Patent No.: US 12,555,036 B2
(45) Date of Patent: Feb. 17, 2026

(54) WEIGHT SPARSITY IN DATA PROCESSING ENGINES

(71) Applicant: XILINX, INC., San Jose, CA (US)

(72) Inventors: Francisco Barat Quesada, Dublin (IE); Baris Ozgul, Dublin (IE); Dylan Stuart, Maynooth (IE); Stephan Münz, Dublin (IE); Zachary Dickman, Dublin (IE); Javier Cabezas Rodriguez, Austin, TX (US); David Patrick Clarke, Dublin (IE); Pedro Miguel Parola Duarte, Skerries (IE); Peter Mccolgan, Dublin (IE); Juan J. Noguera Serra, San Jose, CA (US)

(73) Assignee: XILINX, INC., San Jose, CA (US)

( * ) Notice: Subject to any disclaimer, the term of this patent is extended or adjusted under 35 U.S.C. 154(b) by 867 days.

(21) Appl. No.: 17/867,630

(22) Filed: Jul. 18, 2022

(65) Prior Publication Data
US 2023/0059970 A1 Feb. 23, 2023

Related U.S. Application Data

(60) Provisional application No. 63/235,310, filed on Aug. 20, 2021.

(51) Int. Cl.
*G06N 20/00* (2019.01)
(52) U.S. Cl.
CPC ................... *G06N 20/00* (2019.01)
(58) Field of Classification Search
None
See application file for complete search history.

(56) References Cited

U.S. PATENT DOCUMENTS

| | | | |
|---|---|---|---|
| 2017/0344876 A1* | 11/2017 | Brothers | G06F 17/15 |
| 2018/0046915 A1* | 2/2018 | Sun | G06N 3/044 |
| 2018/0082181 A1* | 3/2018 | Brothers | G06N 3/045 |
| 2019/0108436 A1* | 4/2019 | David | G06N 3/084 |
| 2019/0115933 A1* | 4/2019 | Chen | G06N 3/04 |
| 2019/0340493 A1* | 11/2019 | Coenen | G06N 3/0495 |
| 2019/0340510 A1* | 11/2019 | Li | G06N 3/04 |
| 2019/0347555 A1* | 11/2019 | Park | G06F 17/16 |
| 2019/0348997 A1* | 11/2019 | Lee | H03M 7/3066 |
| 2021/0158166 A1* | 5/2021 | Azarian Yazdi | G06N 3/048 |
| 2021/0201142 A1* | 7/2021 | Lee | G06N 3/0495 |
| 2021/0406667 A1* | 12/2021 | Timofejevs | G06N 3/045 |

(Continued)

FOREIGN PATENT DOCUMENTS

| | | | | |
|---|---|---|---|---|
| EP | 4044071 A1 * | 8/2022 | | G06N 3/045 |
| KR | 102808579 B1 * | 5/2025 | | G06N 3/0495 |

*Primary Examiner* — Ryan Barrett
(74) *Attorney, Agent, or Firm* — Patterson + Sheridan, LLP

(57) ABSTRACT

Examples herein describe techniques for reducing the amount of memory used during weight sparsity. When decompressing the weights, the uncompressed weight data typically has many zero values. By knowing the location of these zero values (e.g., their indices in a weight matrix), the processor core can prune some of the activations (e.g., logically reduce the size of the activation matrix) which improves the efficiency of the processor core. In embodiments herein, the processor core includes logic for identifying the indices of the non-zero value after decompressing the compressed weights. These indices can then be used to prune the activations to improve the efficiency of the processor core.

14 Claims, 10 Drawing Sheets

(56) References Cited

U.S. PATENT DOCUMENTS

| | | | |
|---|---|---|---|
| 2022/0012592 A1* | 1/2022 | Jain | G06N 3/08 |
| 2022/0019430 A1* | 1/2022 | Sun | G06F 9/3012 |
| 2022/0222313 A1* | 7/2022 | Budagavi | G06F 17/147 |
| 2023/0100930 A1* | 3/2023 | Tan | G06N 3/063 |
| | | | 706/25 |

* cited by examiner

WEIGHT SPARSITY IN DATA PROCESSING ENGINES

CROSS REFERENCE TO RELATED APPLICATION

This application claims priority to the U.S. Provisional Application No. 63/235,310, filed on Aug. 20, 2021 of which is incorporated herein in by reference in its entirety.

TECHNICAL FIELD

Examples of the present disclosure generally relate to compressing weights in machine learning (ML) applications, and more specifically, to handling weight sparsity in data processing engines.

BACKGROUND

Weight sparsity is a strategy to reduce memory usage by compressing the weights used when performing a ML operation. For example; layers in a ML model (e.g., convolution layers) often require the hardware to perform matrix multiplications between the weights and activations (e.g., input data). As such, the weights are stored in memory in the processing cores used to perform the matrix multiplications. To reduce the amount of memory used to store the weights, weight sparsity is the idea of compressing the weights before they are stored in the processor's memory. The processor core then decompresses the weights (which are stored in registers in the core) before performing the matrix multiplications with the activations.

SUMMARY

Techniques for decompressing weights in an ML application are described. One example is an integrated circuit (IC) that includes a data processing engine that includes a local memory configured to store activations and compressed weights for a ML application and a core configured to decompress the compressed weights to generate uncompressed weights, identify locations of zero values by searching through the uncompressed weights, prune the activations based on the locations of the zero values, and perform an ML operation using the pruned activations and the uncompressed weights.

One example is a method that includes storing activations and compressed weights for a ML application in a local memory of a data processing engine (DPE), decompressing the compressed weights in a core of the DPE to generate uncompressed weights, identifying, in the core, locations of zero values by searching through the uncompressed weights, pruning, in the core, the activations based on the locations of the zero values, and performing, in the core, an ML operation using the pruned activations and the uncompressed weights.

One example is an IC that includes a data processing engine that has a local memory configured to store uncompressed first data and compressed second data. The IC also has a core configured to decompress the compressed second data to generate uncompressed third data, identify locations of zero values by searching through the uncompressed third data, prune the uncompressed first data by using the locations of the zero values in the uncompressed third data as selection signals for a plurality of multiplexers in the core where the plurality of multiplexers received the uncompressed first data and the uncompressed third data as inputs, and perform a mathematical operation using the pruned uncompressed first data and the uncompressed third data.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
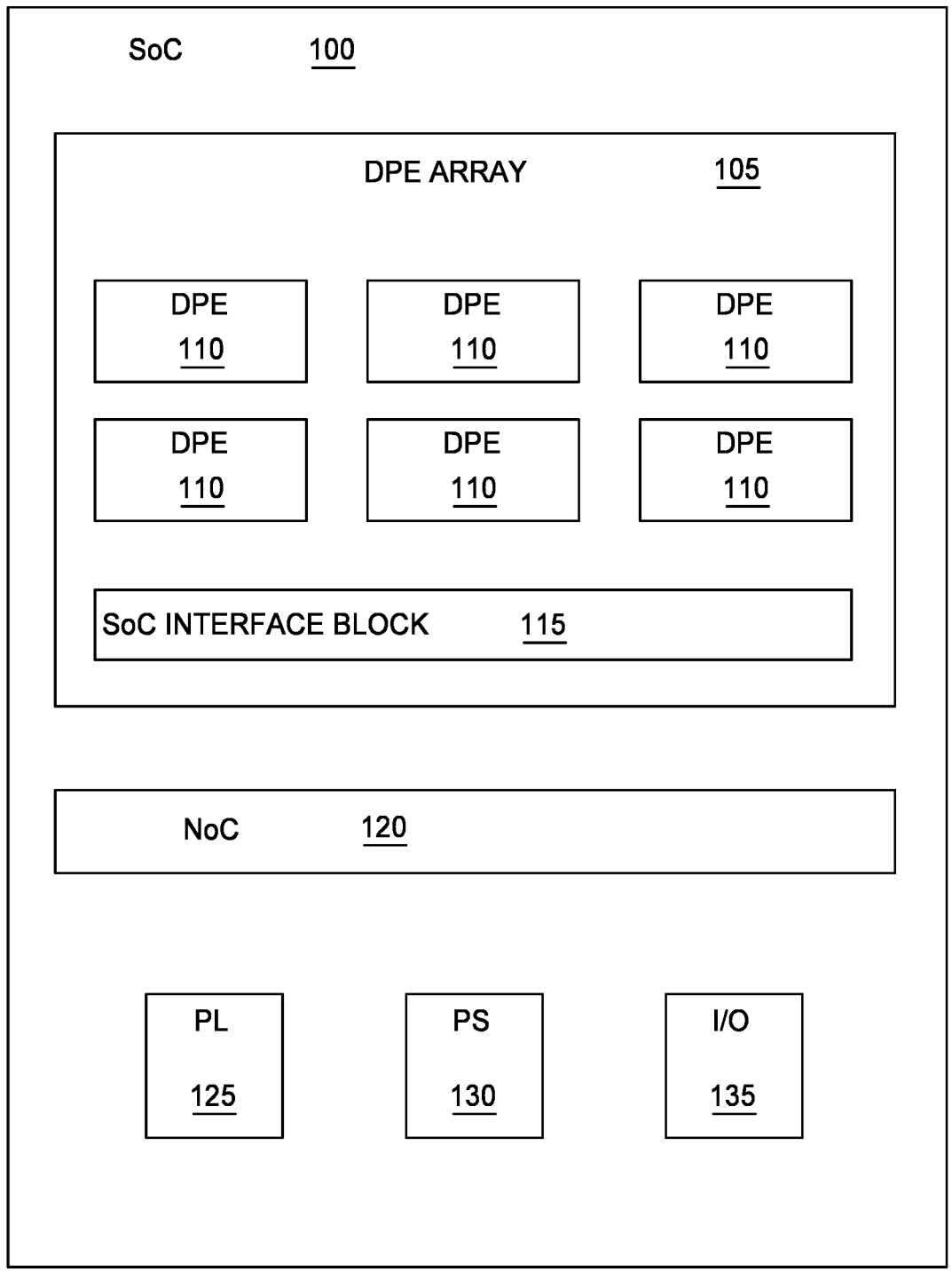
FIG. 1 is a block diagram of a SoC that includes a data processing engine array, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for reducing the amount of memory used during weight sparsity. When decompressing the weights, the uncompressed weight data typically has many zero values. By knowing the location of these zero values (i.e., their indices in a weight matrix), the processor core can prune some of the activations (e.g., logically reduce the size of the activation matrix) which improves the efficiency of the processor core. While the indices of the zero values of the weight matrix can be provided to the processor core (stored in memory along with the compressed weight matrix), this requires additional memory and reduces the benefit of compressing the weight data in the first place. Instead, in embodiments herein, the processor core includes logic for identifying the indices of the non-zero value after decompressing the compressed weights. These indices can then be used to prune the activations to improve the efficiency of the processor core.

FIG. 1 is a block diagram of a SoC 100 that includes a data processing engine (DPE) array 105, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing engines, cryptographic engines, Forward Error Correction (FEC) engines, or other specialized hardware for performing one or more specialized tasks.

In FIG. 1, the array 105 includes DPEs 110 that are all the same type (e.g., a homogeneous array). However, in another embodiment, the array 105 may include different types of engines. For example, the array 105 may include digital signal processing engines, cryptographic engines, graphic processing engines, and the like. Regardless if the array 105 is homogenous or heterogeneous, the DPEs 110 can include direct connections between DPEs 110 which permit the DPEs 110 to transfer data directly as described in more detail below.

In one embodiment, the DPEs 110 are formed from software-configurable hardened logic—i.e., are hardened. One advantage of doing so is that the DPEs 110 may take up less space in the SoC 100 relative to using programmable logic to form the hardware elements in the DPEs 110. That is, using hardened logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SoC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100. However, using the NoC 120, the array 105 can nonetheless communicate with, for example, programmable logic (PL) 125, a processor subsystem (PS) 130 or input/output (I/O) 135 which may be disposed at different locations throughout the SoC 100.

In addition to providing an interface between the DPEs 110 and the NoC 120, the SoC interface block 115 may also provide a connection directly to a communication fabric in the PL 125. In this example, the PL 125 and the DPEs 110 form a heterogeneous processing system since some of the kernels in a dataflow graph may be assigned to the DPEs 110 for execution while others are assigned to the PL 125. While FIG. 1 illustrates a heterogeneous processing system in a SoC, in other examples, the heterogeneous processing system can include multiple devices or chips. For example, the heterogeneous processing system could include two FPGAs or other specialized accelerator chips that are either the same type or different types. Further, the heterogeneous processing system could include two communicatively coupled SoCs.

Figure 2:
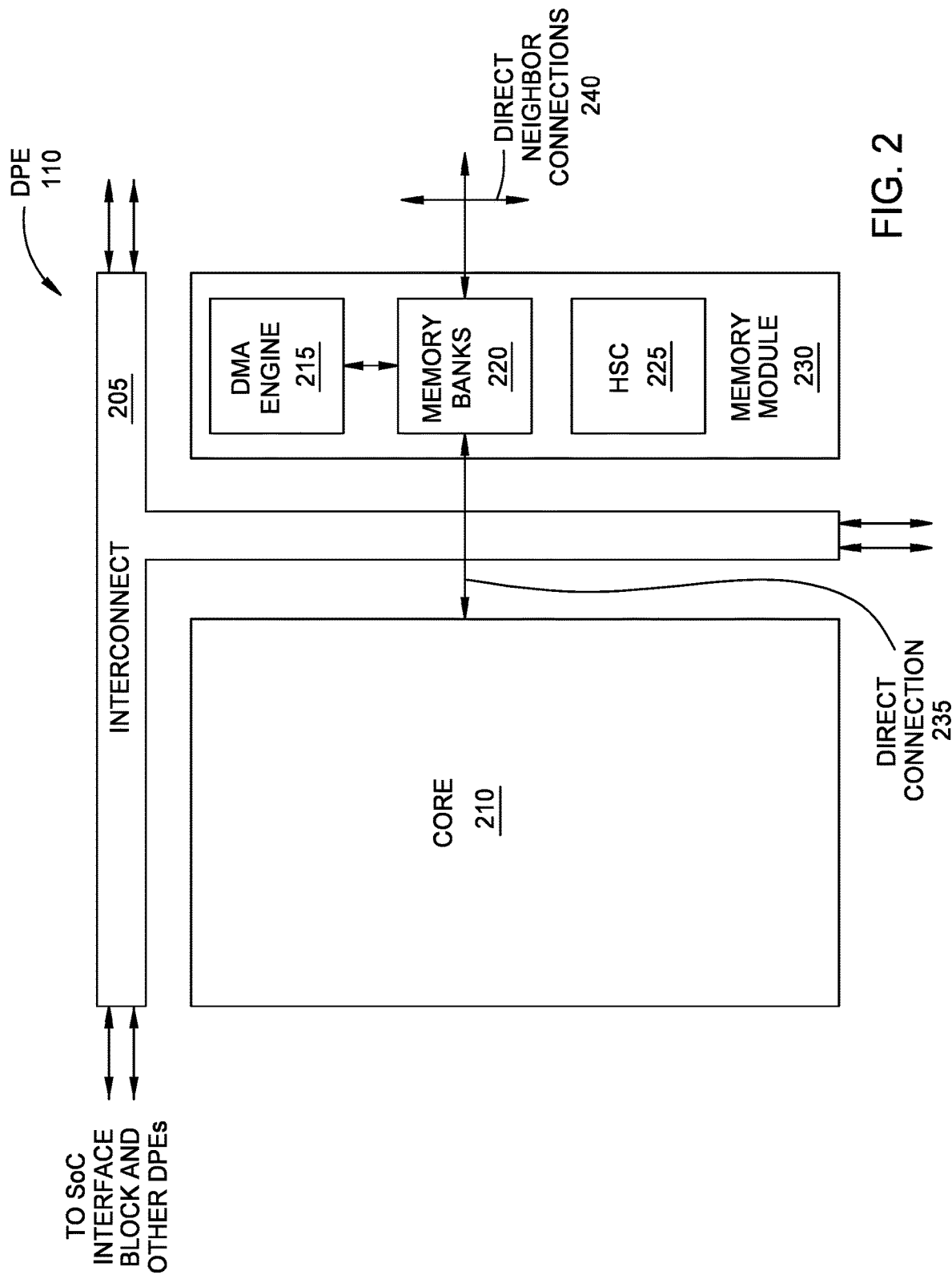
FIG. 2 is a block diagram of a data processing engine in the data processing engine array, according to an example.

This can be difficult for a programmer to manage since communicating between kernels disposed in heterogeneous or different processing cores can include using the various communication interfaces shown in FIG. 1 such as the NoC 120, the SoC interface block 115, as well as the communication links between the DPEs 110 in the array 105 (which are shown in FIG. 2).

In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120. That is, the circuit switching and packet switching described herein can be used to communicatively couple the DPEs 110 to the SoC interface block 115 and also to the other hardware blocks in the SoC 100. In another example, SoC interface block 115 may be implemented in a different die than the DPEs 110. In yet another example, DPE array 105 and at least one subsystem may be implemented in a same die while other subsystems and/or other DPE arrays are implemented in other dies. Moreover, the streaming interconnect and routing described herein with respect to the DPEs 110 in the DPE array 105 can also apply to data routed through the SoC interface block 115.

Although FIG. 1 illustrates one block of PL 125, the SoC 100 may include multiple blocks of PL 125 (also referred to as configuration logic blocks) that can be disposed at different locations in the SoC 100. For example, the SoC 100 may include hardware elements that form a field programmable gate array (FPGA), However, in other embodiments, the SoC 100 may not include any PL 125—e.g., the SoC 100 is an ASIC.

FIG. 2 is a block diagram of a DPE 110 in the DPE array 105 illustrated in FIG. 1, according to an example. The DPE 110 includes an interconnect 205, a core 210, and a memory module 230. The interconnect 205 permits data to be transferred from the core 210 and the memory module 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 relies on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may form routes from the core 210 and the memory module 230 to the neighboring DPEs 110 or the SoC interface block 115. Once configured, the core 210 and the memory module 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110, Although not shown, the interconnect 205 may include a memory mapped interconnect which includes different connections and switch elements used to set values of configuration registers in the DPE 110 that alter or set functions of the streaming network, the core 210, and the memory module 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-to-point communication path used when performing circuit switching in the interconnect 205 is not shared with other streams (regardless whether those streams are circuit switched or packet switched). However, when transmitting streaming data between two or more DPEs 110 using packet-switching, the same physical wires can be shared with other logical streams.

The core 210 may include hardware elements for processing digital signals. For example, the core 210 may be used to process signals related to wireless communication, radar, vector operations, machine learning applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in a digital signal processing engine, cryptographic engine, or FEC may be different.

The memory module 230 includes a DMA engine 215, memory banks 220, and hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the SoC interface block or other DPEs 110 in the array.

The memory banks 220 can include any number of physical memory elements (e.g., SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the core (or the DMA engine 215; requests a lock acquire to the HSC 225 when it wants to read or write to the memory banks 220 (i.e., when the core/DMA engine want to "own" a buffer, which is an assigned portion of the memory banks 220. If the core or DMA engine does not acquire the lock, the HSC 225 will stall (e.g., stop) the core or DMA engine from accessing the memory banks 220, When the core or DMA engine is done with the buffer, they release the lock to the HSB 225. In one embodiment, the HSC 225 synchronizes the DMA engine 215 and core 210 in the same DPE 110 (i.e., memory banks 220 in one DPE 110 are shared between the DMA engine 215 and the core 210). Once the write is complete, the core (or the DMA engine 215) can release the lock which permits cores in neighboring DPEs to read the data.

Because the core 210 and the cores in neighboring DPEs 110 can directly access the memory module 230, the memory banks 220 can be considered as shared memory between the DPEs 110. That is, the neighboring DPEs can directly access the memory banks 220 in a similar way as the core 210 that is in the same DPE 110 as the memory banks 220. Thus, if the core 210 wants to transmit data to a core in a neighboring DPE, the core 210 can write the data into the memory bank 220. The neighboring DPE can then retrieve the data from the memory bank 220 and begin processing the data. In this manner, the cores in neighboring DPEs 110 can transfer data using the HSC 225 while avoiding the extra latency introduced when using the interconnects 205. In contrast, if the core 210 wants to transfer data to a non-neighboring DPE in the array (i.e., a DPE without a direct connection 240 to the memory module 230), the core 210 uses the interconnects 205 to route the data to the memory module of the target DPE which may take longer to complete because of the added latency of using the interconnect 205 and because the data is copied into the memory module of the target DPE rather than being read from a shared memory module.

In addition to sharing the memory modules 230, the core 210 can have a direct connection to cores 210 in neighboring DPEs 110 using a core-to-core communication link (not shown). That is, instead of using either a shared memory module 230 or the interconnect 205, the core 210 can transmit data to another core in the array directly without storing the data in a memory module 230 or using the interconnect 205 (which can have buffers or other queues). For example, communicating using the core-to-core communication links may use less latency (or have high bandwidth) than transmitting data using the interconnect 205 or shared memory (which requires a core to write the data and then another core to read the data) which can offer more cost effective communication. In one embodiment, the core-to-core communication links can transmit data between two cores 210 in one clock cycle. In one embodiment, the data is transmitted between the cores on the link without being stored in any memory elements external to the cores 210. In one embodiment, the core 210 can transmit a data word or vector to a neighboring core using the links every clock cycle, but this is not a requirement.

In one embodiment, the communication links are streaming data links which permit the core 210 to stream data to a neighboring core. Further, the core 210 can include any number of communication links which can extend to different cores in the array. In this example, the DPE 110 has respective core-to-core communication links to cores located in DPEs in the array that are to the right and left (east and west) and up and down (north or south) of the core 210. However, in other embodiments, the core 210 in the DPE 110 illustrated in FIG. 2 may also have core-to-core communication links to cores disposed at a diagonal from the core 210. Further, if the core 210 is disposed at a bottom periphery or edge of the array, the core may have core-to-core communication links to only the cores to the left, right, and bottom of the core 210.

However, using shared memory in the memory module 230 or the core-to-core communication links may be available if the destination of the data generated by the core 210 is a neighboring core or DPE. For example, if the data is destined for a non-neighboring DPE (i.e., any DPE that DPE 110 does not have a direct neighboring connection 240 or a core-to-core communication link), the core 210 uses the interconnects 205 in the DPEs to route the data to the appropriate destination. As mentioned above, the interconnects 205 in the DPEs 110 may be configured when the SoC is being booted up to establish point-to-point streaming connections to non-neighboring DPEs to which the core 210 will transmit data during operation.

Figure 3:
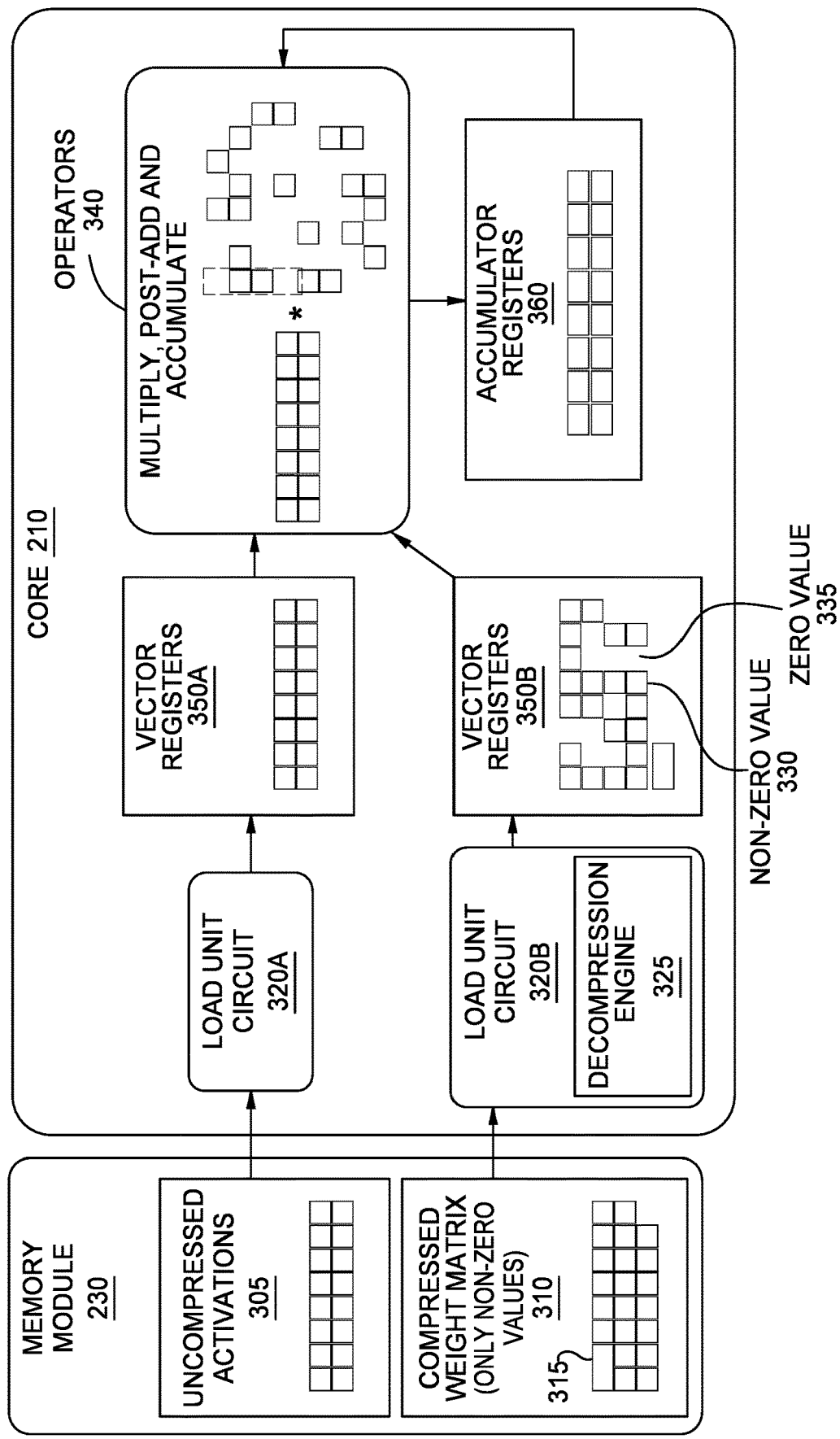
FIG. 3 illustrates weight sparsity in a data processing engine core, according to an example.

FIG. 3 illustrates weight sparsity in a DPE core 210, according to an example. As shown, the memory module 230 in the DPE stores uncompressed activations 305 (which is user data or input data that is processed by a ML application) and a compressed weight matrix 310. The layers in the ML application (e.g., convolution layers, normalization layers, pooling layers, activation layers, and the like) use the weights in the compressed weight matrix 310 to process the activations 305 to make a prediction (e.g., whether an image contains a certain object, provide a medical diagnosis, characterize audio data, and the like).

To save space in the memory module 230, the weights have been compressed before being stored in the memory module 230. In this case, the compressed weights matrix 310 includes a mask 315 along with the compressed weight data. The mask 315 provides information that a decompression engine 325 uses to decompress the compressed weights. When decompressing the weights, many of the weight values are zero. As discussed below, knowing the location or indices of these zeros can be used to improve the efficiency of the core 210. Rather than storing the indices of the zero values in the memory module 230 (which negates the benefit of compressing the weights in the first place), the core 210 identifies the location of the zero values.

The core 210 includes load unit circuits 320A and 320B which receive the uncompressed activations 305 and the compressed weight matrix 310. Specifically, the load unit circuit 320B includes a decompression engine 325 for decompressing the weights in the matrix 310 using the mask 315. The resulting uncompressed weights are stored in vector registers 350B which now have non-zero values 330 and zero values 335. That is, in this example, the compressed weight data does not store weights with zero values. However, after decompressing the matrix 310, the uncompressed weights now have non-zero and zero values.

The load unit circuit 320B can also identify the indices or locations of the zero values 335 in the weight matrix. Many layers in ML applications request that the core 210 perform a mathematical operation using the uncompressed weights stored in the vector registers 350A and the activations stored in the vector registers 350A. For example, the core 210 may perform a matrix multiplication between the weights and the activations, which requires a series of dot products. However, performing the dot product with weights having a zero value 335 results in a zero value. The embodiments herein can take advantage of knowing the location of the zero values 335 in order to simplify the matrix multiplication between the weights and the activations.

The core 210 includes mathematical operators 340 (e.g., circuitry) for performing an operation between the activations and the uncompressed weights such as matrix multiplications and dot products. However, the operators 340 can perform other mathematical operations on the activations or the weights such as scaling operations, bit shifts, and the like. Further, the core 210 includes accumulator registers 360 for storing intermediate calculations made by the operators 340 when performing the mathematical operations.

Figure 4:
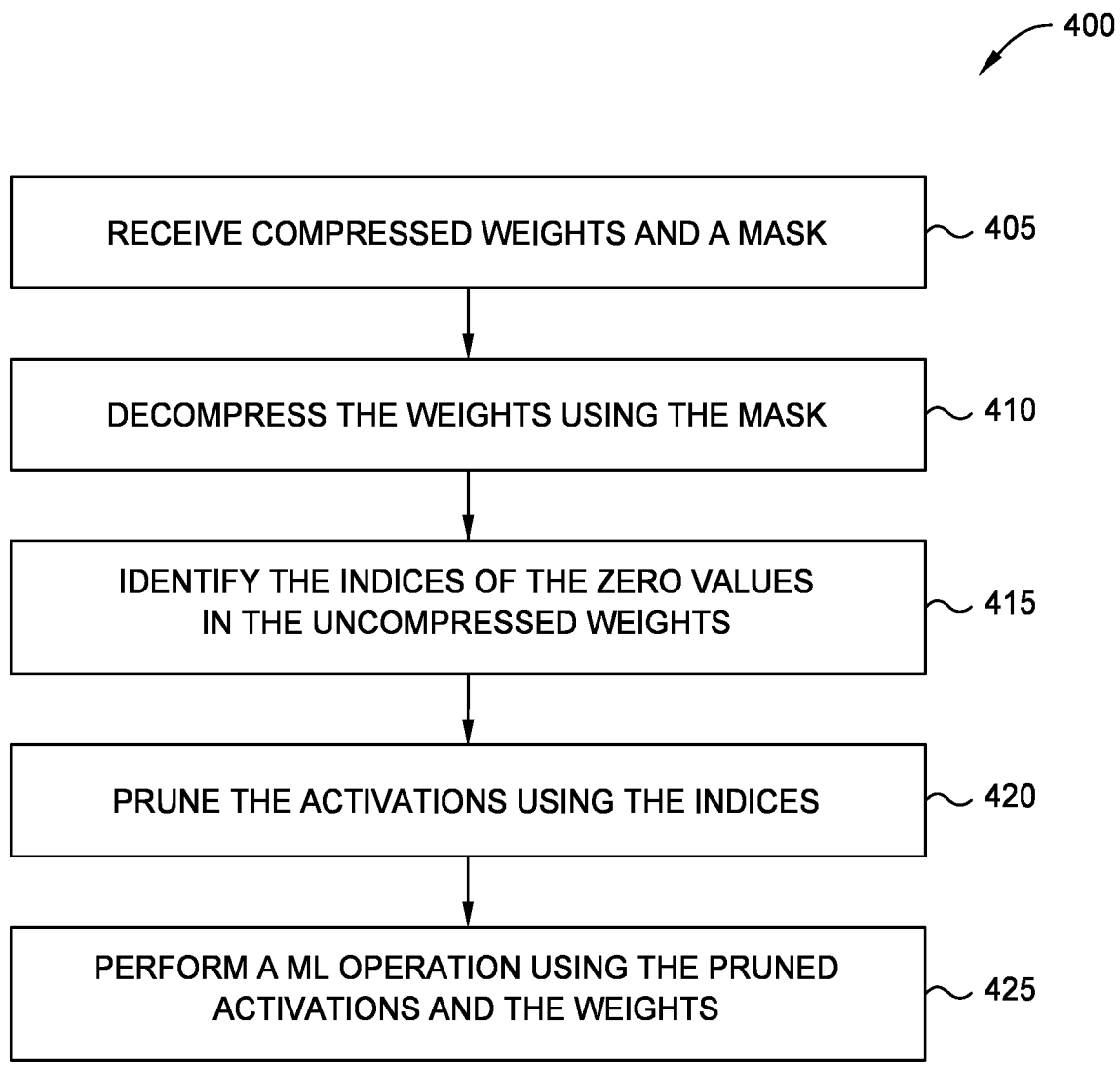
FIG. 4 is a flowchart for using indices of zero weight values to reduce computations for weight sparsity, according to an example.

FIG. 4 is a flowchart of a method 400 for using indices of zero weight values to reduce computations for weight sparsity, according to an example. For ease of explanation, the method 400 is discussed in tandem with FIG. 5 which is a block diagram of a DPE core.

At block 405, a memory module of a DPE receives compressed weights and a mask (e.g., the compressed weight matrix 310 in FIG. 3), The weights may have been compressed by an ML application executing on a host computer, or compressed using some other hardware element on an integrated circuit containing the DPE.

Figure 5:
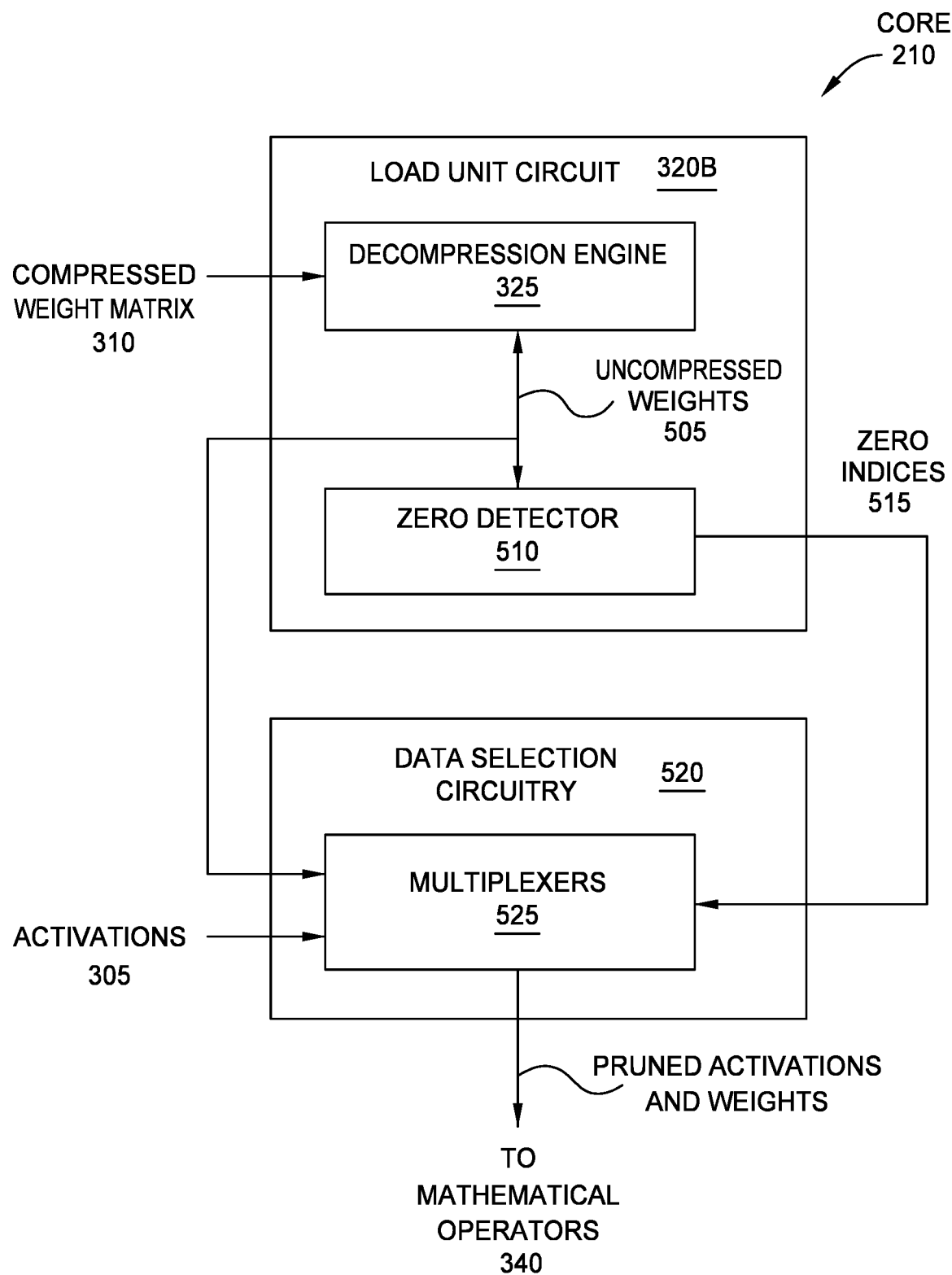
FIG. 5 is a block diagram of a data processing engine core, according to an example.

At block 410, the core of the DPE decompresses the weights using the mask. In FIG. 5, the load unit circuit 320B in the core 210 includes the decompression engine 325 that receives the compressed weight matrix 310 and decompresses the weights to result in a uncompressed weight matrix containing uncompressed weights 505. The uncompressed weights 505 can include weights with non-zero and zero values.

At block 415, a zero detector 510 in the load unit circuit 320B identifies the indices of the zero values in the uncompressed weights 505. For example, the zero detector 510 can search through the uncompressed weights 505 output by the decompression engine 325 to identify indices 515, or more generally, locations that contain weights with a zero value. The zero detector 510 may raster or iterate through the uncompressed weights 505 to identify the indices 515 of the zero values.

At block 420, the core 210 prunes the activations using the indices 515. In FIG. 5, data selection circuitry 520 in the core 210 receives both the uncompressed weights 505 and the activations 305. In general, the data selection circuitry 520 can be any circuitry for selecting a subportion of the activations 305 in response to the zero indices 515. In this example, the data selection circuitry 520 includes multiplexers 525 which use the zero indices 515 as selection signals to control which of the activations 305 are forwarded to the mathematical operators 340 and which ones are ignored or pruned. That is, by knowing the zero indices 515, the data selection circuitry 520 can prune or ignore activations 305 that will not affect a matrix multiplication between the activations 305 and the uncompressed weights 505 since these activations would be multiplied with weights with zero values. As shown in FIG. 5, using the zero indices 515 as selection signals, the multiplexers 525 output only the pruned activations and weights to the operators 340 which permits the operators 340 to operate more efficiently relative to a system where all the activations 305 and uncompressed weights are sent to the operators 340.

At block 425, the operators 340 perform a ML operation (e.g., a dot product or matrix multiplication) using the pruned activations and the weights.

Figure 6:
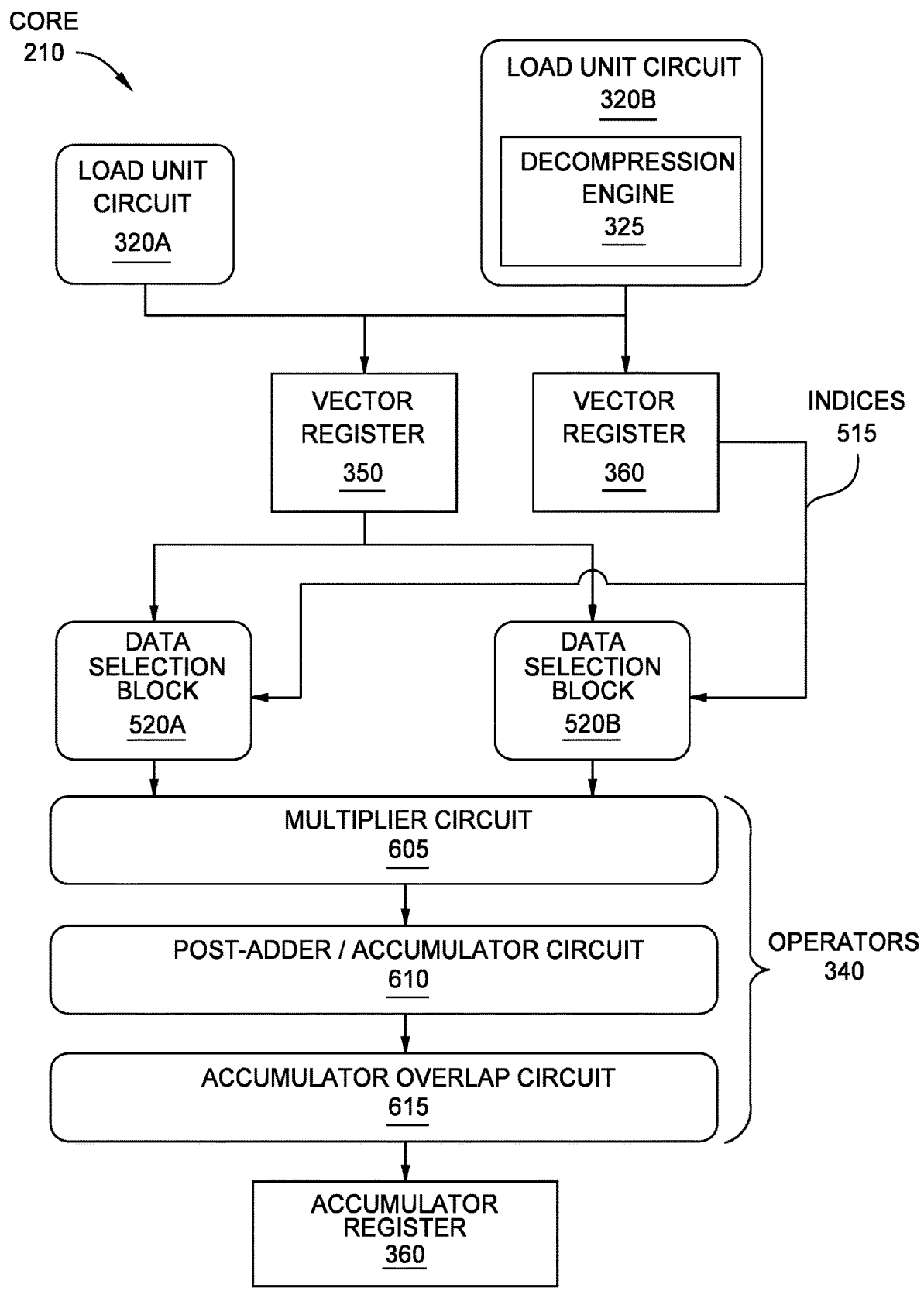
FIG. 6 is a block diagram of a data processing engine core, according to an example.

FIG. 6 is a block diagram of a DPE core 210, according to an example. FIG. 6 illustrates many of the same hardware circuitry already discussed in FIGS. 3 and 5 as indicated by reusing the same reference numbers. In addition to this circuitry, FIG. 6 illustrates one exemplary implementation of the operators 340 which includes a multiplier circuit 605, a post-adder/accumulator circuit 610, and an accumulator overlap circuit 615. These circuits may be used in the core 210 to perform a matrix multiplication between a matrix of uncompressed activations and a matrix of uncompressed weights. However, as discussed in FIGS. 4 and 5, the indices 515 of the zero values in the matrix of uncompressed weights can be used to prune the activations so that fewer activations are sent to the operators 340. The zero values of the weight matrix may also not be sent to the operators 340 for processing.

Based on the indices 515, the data selection circuitry 520 can reduce activations to a smaller matrix or block of data. For example, the memory module in the DPE may store a 4×16 matrix of activations. But if a 50% sparsity compression technique is used as shown in FIG. 3 (where half of the weights are zeros), the data selection circuitry 520 can output a 4×8 matrix or block of activations to the multiplier circuit 605. Similarly, the uncompressed weights may form a matrix of 16×8, but half of these are zeros. In this example, the data selection circuitry 520 forwards a 4×8 block of activations and a 8×8 block of non-zero weights to the operators 340 for processing (e.g., to perform a matrix multiplication between the two blocks of data). As discussed in detail below, this is an example of 50% sparsity, but the data can use other sparsity levels such as 75% sparsity where three-fourths of the weights are zero values.

Figure 7:
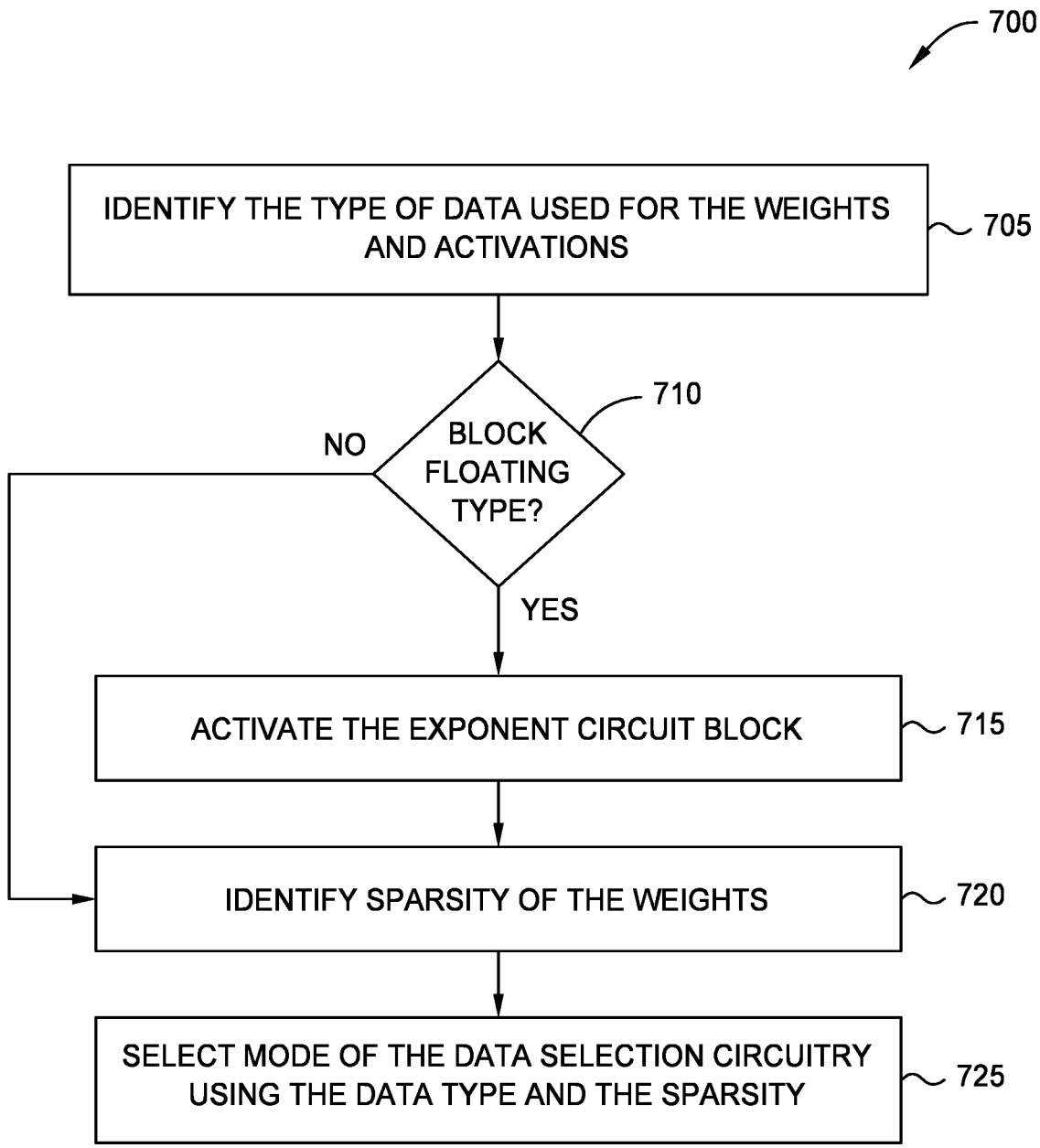
FIG. 7 is a flowchart for selecting a mode of data selection circuitry, according to an example.

FIG. 7 is a flowchart of a method 700 for selecting a mode of data selection circuitry, according to an example. For ease of explanation, the method 700 is discussed in tandem with FIG. 8 that illustrates different data types for weights and FIG. 9 which is a block diagram of a data processing engine core.

At block 705, the core identifies the type of data used for the weights and activations. For example, the instructions received by the core for performing the mathematical operations on the weights and activations may be formatted according to an Instructure Set Architecture (ISA) which indicates the data type of the weights and activations (e.g., integer, floating point, etc.).

Figure 8:
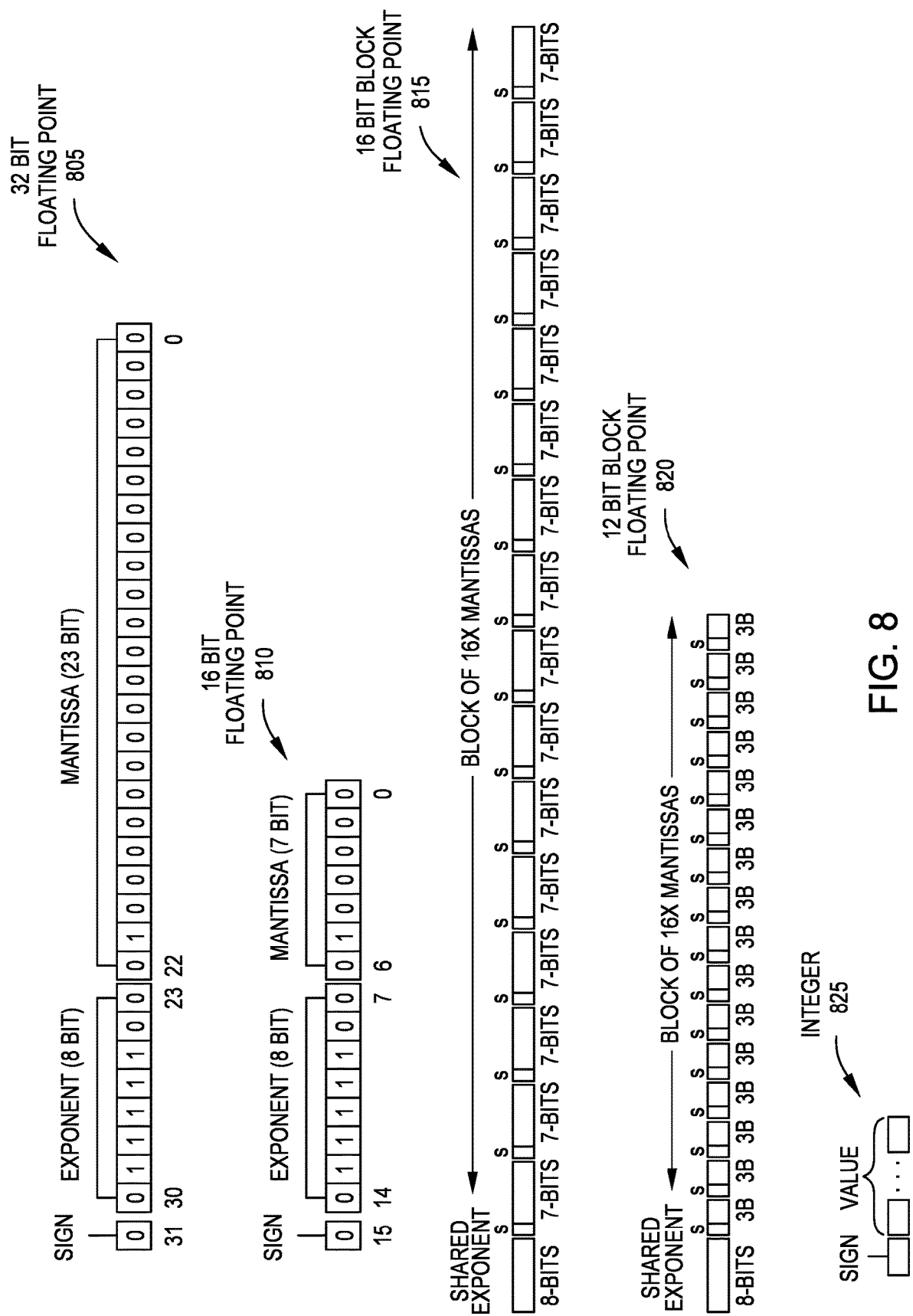
FIG. 8 illustrates different data types for weights, according to an example.

FIG. 8 illustrates different data types that can be used for the weights and activations. Specifically, FIG. 8 illustrates how data is formatted for a 32-bit floating point 805, a 16-bit floating point 810, a 16-bit block floating point 815, a 12-bit block floating point 820, and an integer 825. The 32-bit floating point 805 data type includes a sign for indicating whether the value is negative and positive, an 8-bit exponent, and a 23 bit mantissa. The 16-bit floating point 810 data type also has a sign bit and an 8-bit exponent but only a 7-bit mantissa.

The block floating point data type is a relatively new data type where the exponent is shared by multiple mantissas. For example, the 16-bit block floating point 815 includes an 8-bit exponent which is shared by 16, 7-bit mantissas. That is, there are 16 floating point values included within the single 16-bit block floating point value. The combination of the shared exponent and the 16 individual mantissas generate the 16 different floating point values.

The 12-bit block floating point 820 data type is similar in that it has an 8-bit exponent that is shared by 16 mantissas to represent 16 different floating point values. However, the mantissas for the 12-bit block floating point 820 data type are each only 3 bits.

Unlike the floating point data types, the integer 825 does not include an exponent and mantissa but rather a sign and value bits. The integer 825 can be any length of bits such as a INT-4, INT-8, INT-16, etc.

The activations and weights discussed above can be formatted using any of the data types in FIG. 8 (or any other data type). The method 700 can be used to adapt the core 210 (e.g., the hardware) to perform mathematical operations on a variety of different data types. That is, the core 210 is compatible with multiple different data types. That way, the ML application can format data in any number of different data types that can still be processed by the core 210.

At block 710, after determining the data type, the core determines whether the data type is a block floating point rather than a more traditional data type such as a traditional floating point or an integer.

Figure 9:
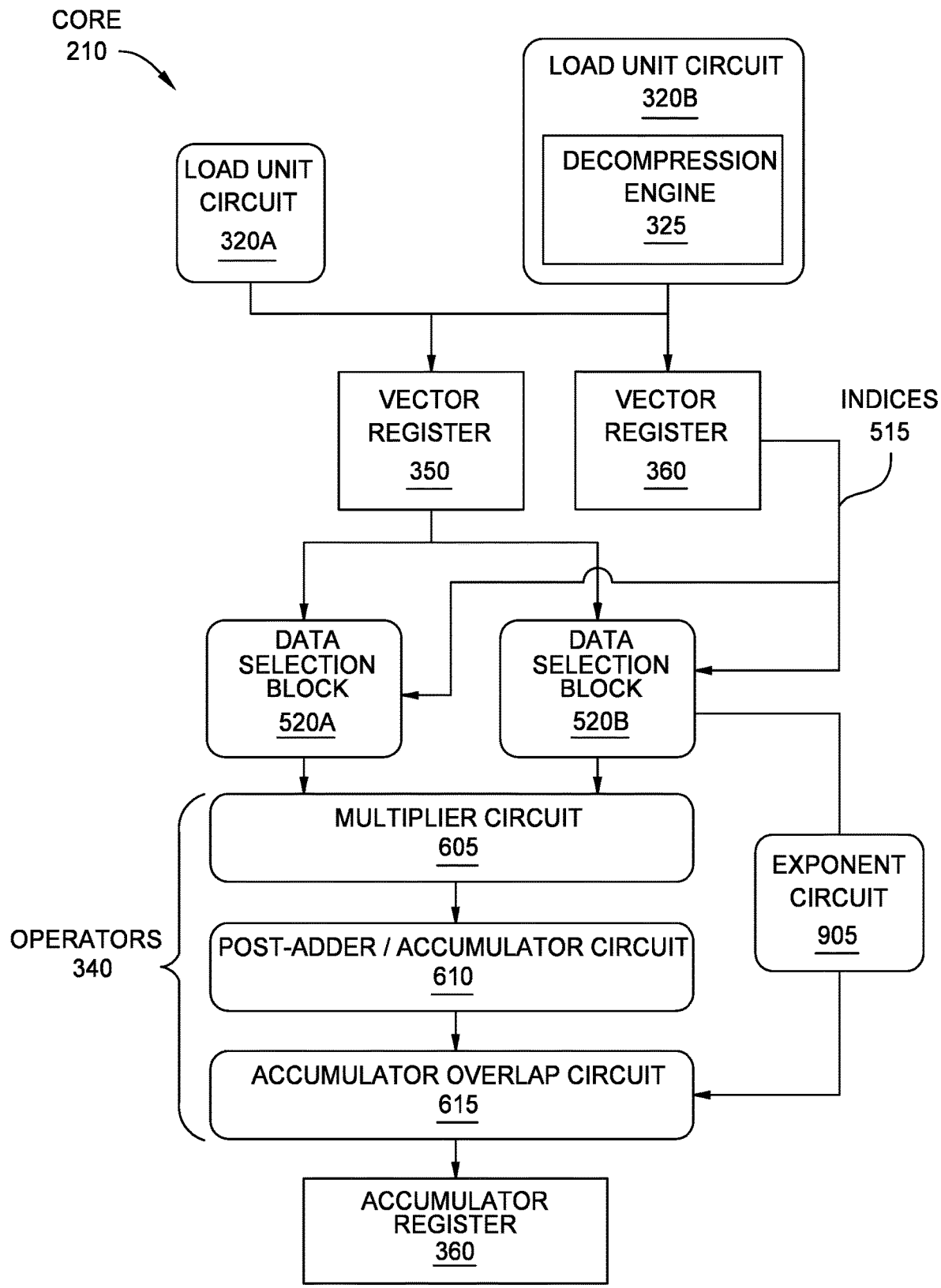
FIG. 9 is a block diagram of a data processing engine core, according to an example, according to an example.

Assuming the data type of the activations or weights is the block floating point, the method 700 proceeds to block 715 where the core activates an exponent circuit block. As discussed above, the block floating point has an exponent that is shared by multiple mantissas. FIG. 9 illustrates an embodiment where the core 210 includes exponent circuitry 905 for handling the shared exponent. That is, the core 210 has dedicated hardware for processing the shared exponent. Otherwise, if the data type for the weights or activations is a traditional floating point or integer, the exponent circuitry 905 may be deactivated or unused when performing the mathematical operation.

Because weight sparsity may be used, some of the mantissas in a block floating point may be zeros (e.g., half of the mantissas are zero if 50% sparsity is used). Nonetheless, the exponent is shared by all the mantissas, including the non-zero mantissa values. Thus, the exponent circuitry 905 gives the core 210 the flexibility to handle an exponent that is shared by both zero and non-zero mantissas. The exponent circuitry 905 may not be needed if the core 210 never receives block floating points.

At block 720, the core identifies the sparsity of the weights. In this example, the ML application may format the weights with different sparsity—e.g., 50% sparsity where half the weights are zeros or 75% sparsity where three-fourths of the weights are zeros. In this example, the core 210 has the ability to handle multiple levels of sparsity. In one embodiment, the instruction can include information indicating to the core 210 the sparsity of the data (e.g., whether it is 50% sparsity or 75% sparsity).

At block 725, the core selects a mode of the data selection circuitry using the data type and the sparsity identified at blocks 705 and 720. Referring again to FIG. 9, the data selection circuitry 520 has different modes that can be selected in response to the type of the weights and activations as well as the sparsity. In one embodiment, the data selection circuitry 520 includes different groups or sets of multiplexers that are used depending on the particular combination of the data type and the sparsity. For example, a first set of multiplexers (e.g., a first mode) is selected when the weights/activations are 32-bit floating points with a sparsity of 50% but a second set of multiplexers (e.g., a second mode) is selected when the weights/activations are 32-bit floating points with a sparsity of 75%. Further, a third set of multiplexers (e.g., a third mode) is selected when the weights/activations are INT4 with a sparsity of 50%. The sets of multiplexers for these three modes may be different (although some of the multiplexers may be common to the three modes). In this manner, the data selection circuitry 520 is designed with flexibility to be compatible with different combinations of data types and sparsity. With the proper mode selected, the data selection circuitry 520 then outputs the data to the operators 340 so the data is processed efficiently and correctly for the particular data type and sparsity.

In addition to selecting a mode of the data selection circuitry 520 in response to data type and sparsity, block size may also be considered. The block size is the manner in which the data for the weights/activation is divided. For example, the data may be divided into four or eight blocks in the data selection circuitry 520 before being forwarded to the operators 340. The core 210 may select different modes for the data selection circuitry 520 according to the block size being used. For example, dividing the data into four blocks may correspond to a different mode than dividing the data into eight blocks. Thus, the block size, data type, and the sparsity may all be used to select a mode of the data selection circuitry 520 which it uses to input data into the operators. However, in other embodiment, the core 210 may support only one block size in which case the mode of the data selection circuitry would not be selected based on block size (since it is fixed).

Figure 10:
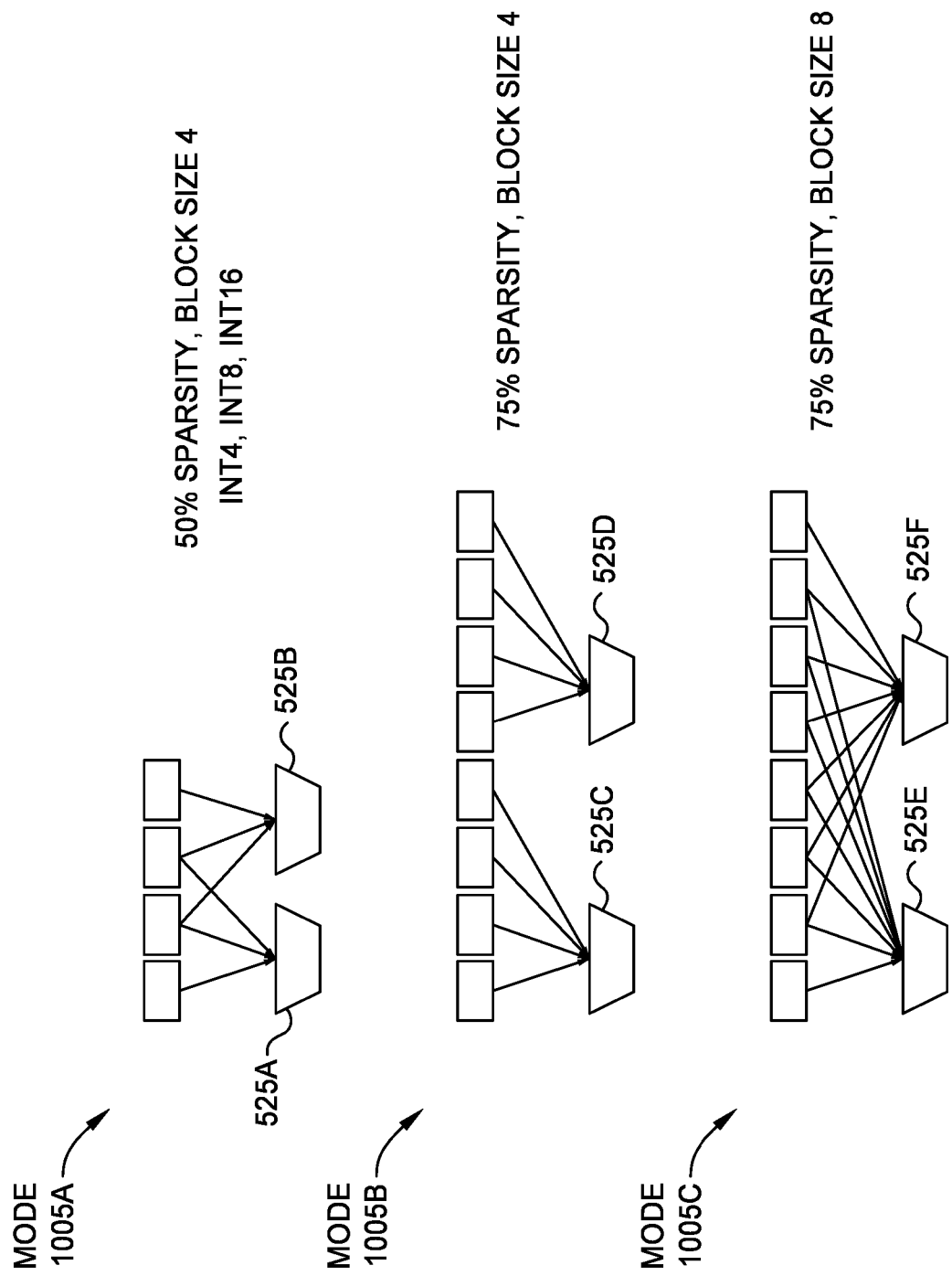
FIG. 10 illustrates different modes of data selection circuitry, according to an example.

FIG. 10 illustrates different modes of data selection circuitry, according to an example, in mode 1005A, the received data (e.g., the weights or activations) is divided into four blocks with a sparsity of 50%, where the data backs are used as input into the multiplexers 525A and 525B. The data type can be INT4, INT8, or INT 16. That is, the same mode 1005A may be used regardless of the length of the integer. It is assumed the data type of the data for the other modes 1005B and 1005C is also an integer.

In mode 1005B, the received data is again divided into four blocks but this time has a sparsity of 75%. In this case, eight total data blocks are fed into the multiplexers 525C and 525D which can be the same multiplexers or different multiplexers from the ones used during mode 1005A.

In mode 1005C, the received data is divided into eight blocks that have a sparsity of 75%. In this case, the eight data blocks are fed into the multiplexers 525E and 525F which can be the same multiplexers or different multiplexers from the ones used during modes 1005A and 1005B. In this manner, the data selection circuit is configured to have different modes 1005 which can support different block sizes and sparsity. The modes can also be expanded to include different data types, although this is not shown in FIG. 10.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations: the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC), comprising:
a data processing engine comprising:
 a local memory configured to store activations and compressed weights for a machine learning (ML) application, and
 a core configured to:
  decompress the compressed weights to generate uncompressed weights, wherein the uncompressed weights are arranged in a matrix,
  identify locations of zero values by searching through the uncompressed weights, wherein identifying the locations comprises:
   identifying indices of the zero values in the matrix of the uncompressed weights;
  prune the activations based on the locations of the zero values; and
  perform an ML operation using the pruned activations and the uncompressed weights,
 wherein the core comprises data selection circuitry configured to prune the activations to block, based on the indices of the zero values, a subset of the activations from reaching operator circuitry that performs the ML operation.

2. The IC of claim 1, wherein the data selection circuitry comprises:
a plurality of multiplexers configured to receive the activations as an input and use the indices of the zero values as selection signals in order to prune the activations.

3. The IC of claim 1, wherein the data selection circuitry is configured to operate in different modes, wherein the core is configured to select one of the different modes to use when pruning the activations based on a level of sparsity of the compressed weights.

4. The IC of claim 1, wherein the data selection circuitry is configured to operate in different modes, wherein the core is configured to select one of the different modes to use when pruning the activations based on a data type of the compressed weights.

5. The IC of claim 4, wherein the different modes of the data selection circuitry use different sets of multiplexers in the data selection circuitry depending on whether the data type is an integer, a floating point, or a block floating point.

6. The IC of claim 1, wherein the data selection circuitry is configured to divide the compressed weights and the activations according to a predefined block size before pruning the activations based on the indices of the zero values.

7. The IC of claim 1, wherein performing the ML operation using the pruned activations and the uncompressed weights comprises:
performing a matrix multiplication based on the pruned activations and the uncompressed weights.

8. A method, comprising:
storing activations and compressed weights for a machine learning (ML) application in a local memory of a data processing engine (DPE);
decompressing the compressed weights in a core of the DPE to generate uncompressed weights, wherein the uncompressed weights are arranged in a matrix;
identifying, in the core, locations of zero values by searching through the uncompressed weights comprises:
 identifying indices of the zero values in the matrix of the uncompressed weights;
pruning, in the core, the activations based on the locations of the zero values; and
performing, in the core, an ML operation using the pruned activations and the uncompressed weights, wherein the core comprises data selection circuitry that prunes the activations to block, based on the indices of the zero values, a subset of the activations from reaching operator circuitry that performs the ML operation.

9. The method of claim 8, wherein pruning the activations based on the indices comprises:
pruning the activations by using the indices as selection signals in a plurality of multiplexers which receive the activations as inputs.

10. The method of claim 8, further comprising:
selecting a mode from a plurality of different modes to prune the activations based on a level of sparsity of the compressed weights.

11. The method of claim 8, further comprising:
selecting a mode from a plurality of different modes to prune the activations based on a data type of the compressed weights.

12. The method of claim 11, wherein the plurality of different modes use different sets of multiplexers in the data selection circuitry depending on whether the data type is an integer, a floating point, or a block floating point.

13. An integrated circuit (IC), comprising:
a data processing engine comprising:
a local memory configured to store uncompressed first data and compressed second data, and
a core configured to:
decompress the compressed second data to generate uncompressed third data, wherein the uncompressed third data are arranged in a matrix,
identify locations of zero values by searching through the uncompressed third data, wherein identifying the locations comprises:
identifying indices of the zero values in the matrix of the uncompressed third data,
prune the uncompressed first data by using the locations of the zero values in the uncompressed third data as selection signals for a plurality of multiplexers in the core, wherein the plurality of multiplexers received the uncompressed first data and the uncompressed third data as inputs, and
perform a mathematical operation using the pruned uncompressed first data and the uncompressed third data,
wherein the plurality of multiplexers is configured to prune the uncompressed first data to block, based on the indices of the zero values a subset of the uncompressed first data from reaching operator circuitry that performs the mathematical operation.

14. The IC of claim 13, wherein the core is configured to select between different modes to use to prune the uncompressed first data based on a level of sparsity and a data type of the compressed second data.

* * * * *